US011469637B2

(12) United States Patent
Suzuki

(10) Patent No.: US 11,469,637 B2
(45) Date of Patent: Oct. 11, 2022

(54) STATOR COMPRISING AN INSULATOR HAVING A RESTRICTION PORTION AND COVERING A TOOTH

(71) Applicant: DENSO CORPORATION, Kariya (JP)

(72) Inventor: Takumi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 303 days.

(21) Appl. No.: 16/807,530

(22) Filed: Mar. 3, 2020

(65) Prior Publication Data
US 2020/0287437 A1    Sep. 10, 2020

(30) Foreign Application Priority Data

Mar. 5, 2019  (JP) .............................. JP2019-039286

(51) Int. Cl.
| *H02K 3/28* | (2006.01) |
| *H02K 1/14* | (2006.01) |
| *H02K 15/095* | (2006.01) |
| *H02K 15/02* | (2006.01) |
| *H02K 3/18* | (2006.01) |

(Continued)

(52) U.S. Cl.
CPC .............. *H02K 3/28* (2013.01); *H02K 1/148* (2013.01); *H02K 3/18* (2013.01); *H02K 3/345* (2013.01); *H02K 3/522* (2013.01); *H02K 15/02* (2013.01); *H02K 15/095* (2013.01); *H02K 2203/06* (2013.01)

(58) Field of Classification Search
CPC .......... H02K 1/14; H02K 1/148; H02K 15/02; H02K 15/095; H02K 2203/06; H02K 3/18; H02K 3/28; H02K 3/34; H02K 3/345; H02K 3/52; H02K 3/522

USPC .......... 310/194, 195, 214, 216.105, 216.115
See application file for complete search history.

(56) References Cited

U.S. PATENT DOCUMENTS

| 2012/0098381 A1 | 4/2012 | Seki et al. |
| 2013/0200742 A1 | 8/2013 | Seki et al. |
| 2015/0091409 A1 | 4/2015 | Yoshikawa et al. |

(Continued)

FOREIGN PATENT DOCUMENTS

| JP | 2000-341897 A | 12/2000 |
| JP | 2012-110212 A | 6/2012 |

(Continued)

OTHER PUBLICATIONS

U.S. Appl. No. 16/807,450 and its entire file history, filed Mar. 3, 2020, Suzuki.

*Primary Examiner* — Rashad H Johnson
(74) *Attorney, Agent, or Firm* — Maschoff Brennan

(57) ABSTRACT

A stator includes a plurality of core constituent members arranged side by side in a circumferential direction, each of which has a tooth extending in a radial direction and a pair of core outer extension portion extending in the both circumferential directions from a radial outer end portion of the tooth, and an insulator covering at least a part of the tooth, and a coil wound around the tooth via the insulator. The coil includes a terminal inner coil having a terminal line which is drawn from the radially inner side to the one axial side. The insulator covers the tooth that are circumferentially adjacent to the tooth around which the terminal inner coil is wound. The insulator has a restriction portion so as to restrict the movement of the terminal line of the terminal inner coil.

6 Claims, 6 Drawing Sheets

(51) Int. Cl.
  *H02K 3/34* (2006.01)
  *H02K 3/52* (2006.01)

(56) References Cited

U.S. PATENT DOCUMENTS

| | | | |
|---|---|---|---|
| 2015/0303749 A1* | 10/2015 | Okubo | H02K 21/14 |
| | | | 310/156.38 |
| 2017/0141627 A1 | 5/2017 | Seki et al. | |
| 2020/0014288 A1* | 1/2020 | Hotta | H02K 3/522 |
| 2020/0059129 A1* | 2/2020 | Yamashita | H02K 3/46 |

FOREIGN PATENT DOCUMENTS

| | | |
|---|---|---|
| JP | 5502115 B2 | 5/2014 |
| JP | 5502131 B2 | 5/2014 |
| JP | 5536123 B2 | 7/2014 |
| JP | 6247595 B2 | 12/2017 |
| JP | 2019-039285 A | 3/2019 |

\* cited by examiner

STATOR COMPRISING AN INSULATOR HAVING A RESTRICTION PORTION AND COVERING A TOOTH

CROSS REFERENCE TO RELATED APPLICATION

The present application is based on Japanese Patent Application No. 2019-39286 filed on Mar. 5, 2019, the disclosure of which is incorporated herein by reference.

TECHNICAL FIELD

The present disclosure relates to a stator.

BACKGROUND

Conventionally, in a stator, a core constituent member includes a tooth extending inward in a radial direction and a pair of core outer extension portions extending in a circumferential direction from an outer end in the radial direction of the teeth. A plurality of core constituent members are arranged side by side in a circumferential direction. Coils are wound around the tooth via an insulator.

SUMMARY

An object of the present disclosure is to provide a stator which can easily perform a winding operation and can restrict movement of the terminal line.

A stator includes a plurality of core constituent members arranged side by side in a circumferential direction, each of which has a tooth extending in a radial direction and a pair of core outer extension portion extending in the both circumferential directions from a radial outer end portion of the tooth, and an insulator covering at least a part of the tooth, and a coil wound around the tooth via the insulator. The coil includes a terminal inner coil having a terminal line which is drawn from a radially inner side to one side in an axial direction. The insulator covers the tooth circumferentially adjacent to the tooth around which the terminal inner coil is wound. The insulator has a restriction portion that restricts movement of the terminal line of the terminal inner coil.

DETAILED DESCRIPTION

Figure 1:
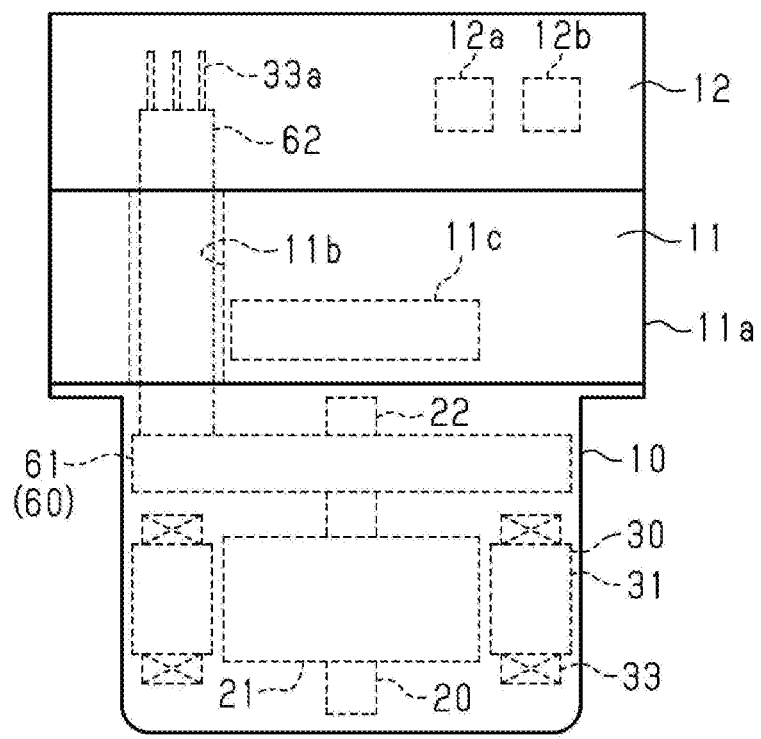
FIG. 1 is a schematic configuration diagram of an electric brake system including a motor according to an embodiment.

Hereinafter, an embodiment of a motor including a stator as an armature will be described with reference to the drawings. In the drawings, for convenience of explanation, part of the configuration may be shown exaggerated or simplified. Also, the dimensional ratio of each part may be different from the actual one.

As shown in FIG. 1, a motor 10 is used for an electric brake system. The electric brake system includes a hydro unit 11 that adjusts a hydraulic pressure of a brake fluid, the motor 10 that is connected to the hydro unit 11 and drives the hydro unit 11, and an EDU (ELECTRIC DRIVER UNIT) 12 that controls a drive of the motor 10. In the brake system of the present embodiment, the hydro unit 11 is interposed between the EDU 12 and the motor 10. The motor 10 and the EDU 12 are electrically connected through a through hole 11b provided in a housing 11a of the hydro unit 11.

The motor 10 of the present embodiment includes a rotor 20 and a stator 30.

As shown in FIG. 1, the rotor 20 is provided on an inner side in a radial direction of the stator 30, and has a rotor core 21, magnets (not shown) provided on the rotor core 21, and a rotation shaft 22 provided at the radial center of the rotor core 21. One end in the axial direction of the rotation shaft 22 is directly or indirectly connected to a gear 11c in the hydro unit 11. As a result, when the rotation shaft 22 is rotationally driven, the gear 11c in the hydro unit 11 is driven to adjust the hydraulic pressure of the brake fluid.

Figure 2:
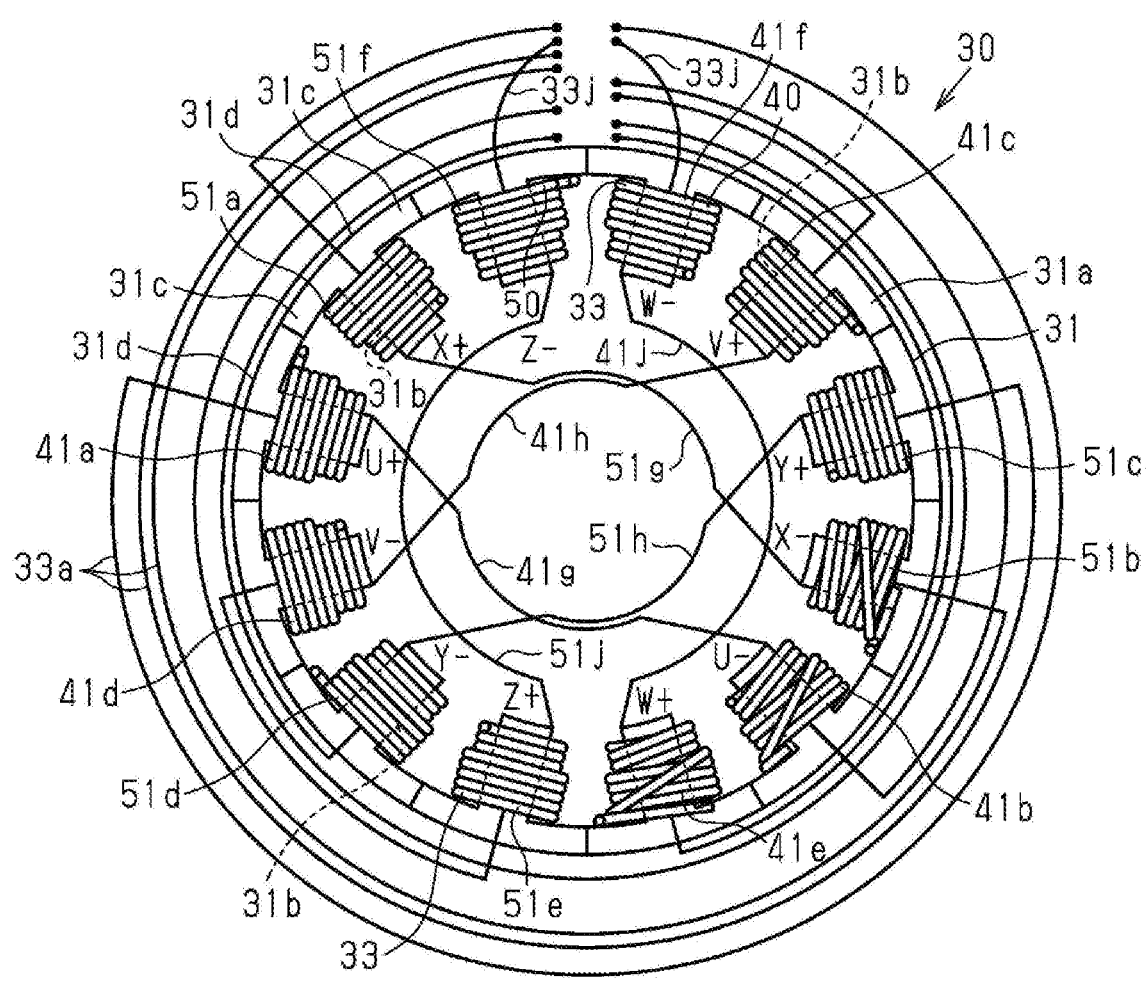
FIG. 2 is a schematic plan view of a stator in the same embodiment.
Figure 3:
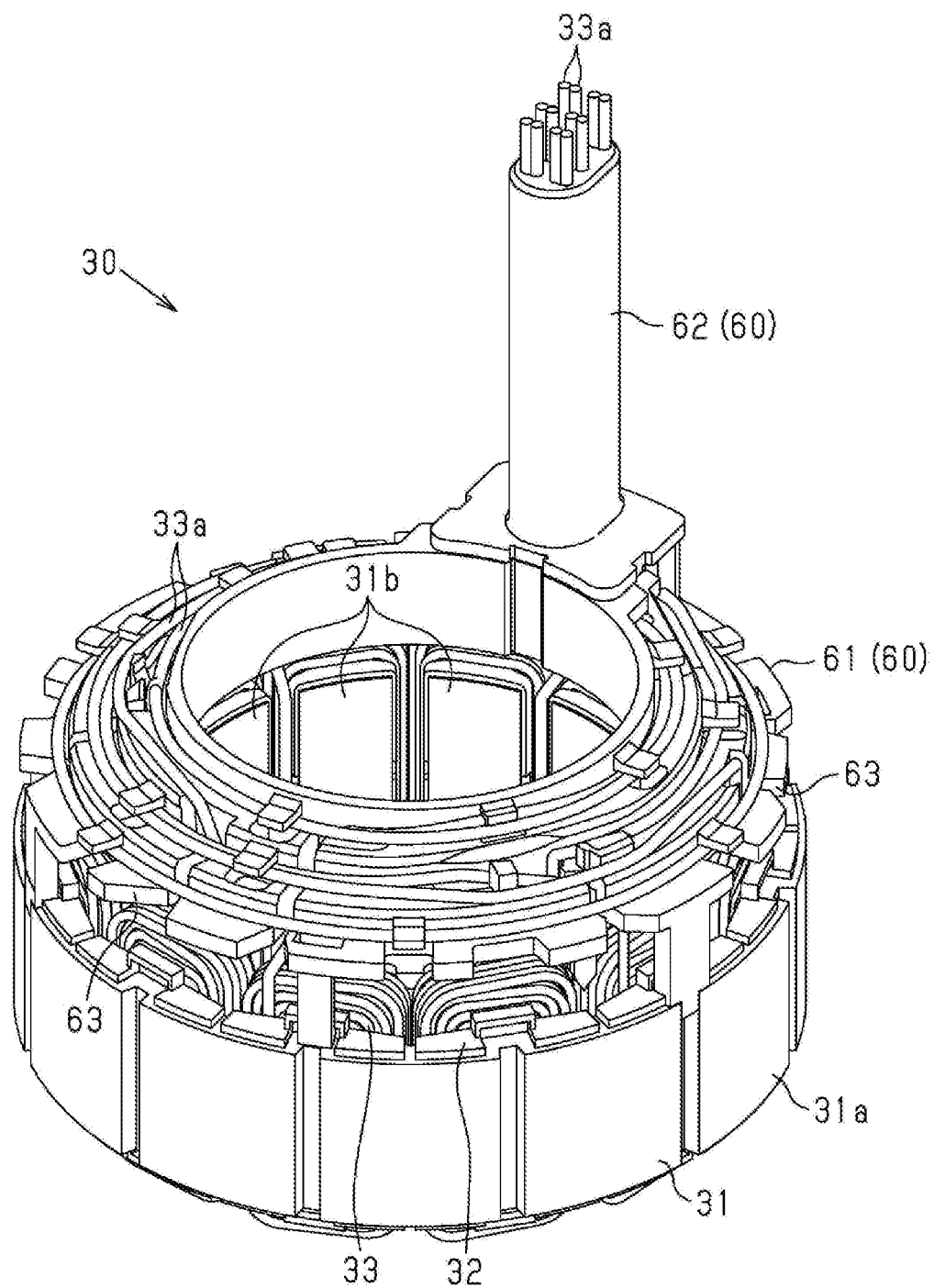
FIG. 3 is a perspective view of the stator in the same embodiment.

As shown in FIGS. 2 and 3, the stator 30 includes a stator core 31, an insulator 32 (not shown in FIG. 2) of the stator core 31, and coils 33.

The stator core 31 has a substantially annular portion 31a and a plurality of teeth 31b extending radially inward from the annular portion 31a. In the present embodiment, for example, twelve teeth 31b are provided. The coils 33 are wound around each of teeth 31b with the insulator 32 located in therebetween. The coils 33 are wound in, for example, a concentrated manner.

The coils 33 include a first three-phase winding 40 which is electrically connected to a first inverter circuit 12a provided in the EDU 12, and a second three-phase winding 50 which is electrically connected to a second inverter circuit 12b provided in the EDU 12. That is, in the present embodiment, first and second inverter circuits 12a and 12b constituting two systems (plurality of systems) in EDU 12 are provided, and the first and second inverter circuits 12a and 12b are supplied current to each of the three-phase windings 40 and 50.

As shown in FIG. 2, the first three-phase winding 40 has a plurality of three-phase windings 41a to 41f to which a three-phase alternating current having a phase difference of 120 degrees is supplied from the first inverter circuit 12a. The plurality of three-phase windings 41a to 41f includes U+phase winding 41a, U−phase winding 41b, V+phase winding 41c, V−phase winding 41d, W+phase winding 41e, and W−phase winding 41f.

As shown in FIG. 2, the second three-phase winding 50 has a plurality of three-phase windings 51a to 51f to which a three-phase alternating current having a phase difference of 120 degrees is supplied from the second inverter circuit 12b. The plurality of three-phase windings 51a to 51f include X+phase winding 51a, X−phase winding 51b, Y+phase winding 51c, Y−phase winding 51d, Z+phase winding 51e, and Z−phase winding 51f.

The coil 33 of the present embodiment is wound, for example, in the order of W−phase winding 41f, V+phase winding 41c, Y+phase winding 51c, X−phase winding 51b, U−phase winding 41b, W+phase winding 41e, Z+phase winding 51e, Y−phase winding 51d, V−phase winding 41d, U+phase winding 41a, X+phase winding 51a, Z−phase winding 51f, for each tooth 31b. Thus, all the coils 33 of the present embodiment have different phases from the coils 33 adjacent in the circumferential direction.

Here, the winding directions in which the U+phase winding 41a and the U−phase winding 41b are wound around the teeth 31b are the same. The winding directions in which the V+phase winding 41c and the V−phase winding 41d are wound around the teeth 31b are the same. Further, the winding directions in which the W+phase winding 41e and the W−phase winding 41f are wound around the teeth 31b are the same. The U+phase winding 41a and the U−phase winding 41b are wound around teeth 31b provided at positions different by 150 degrees in the circumferential direction. The V+phase winding 41c and the V−phase winding 41d are wound around teeth 31b provided at positions different by 150 degrees in the circumferential direction. The teeth 31b around the W+phase winding 41e is wound and the teeth 31b around the W−phase winding 41f is wound are provided at positions different by 150 degrees in the circumferential direction.

Furthermore, the winding directions in which the X+phase winding 51a and the X−phase winding 51b are wound around the teeth 31b are the same. The winding directions in which the Y+phase winding 51c and the Y−phase winding 51d are wound around the teeth 31b are the same. Further, the winding directions in which the Z+phase winding 51e and the Z−phase winding 51f are wound around the teeth 31b are the same. The teeth 31b around the X+phase winding 51a is wound and the teeth 31b around the X−phase winding 51b is wound are provided at positions different by 150 degrees in the circumferential direction. The teeth 31b around which the Y+phase winding 51c is wound and the teeth 31b around which the Y−phase winding 51d is wound are provided at positions different by 150 degrees in the circumferential direction. The teeth 31b around the Z+phase winding 51e is wound and the teeth 31b around the Z−phase winding 51f is wound are provided at positions different by 150 degrees in the circumferential direction.

The U+phase winding 41a and the U−phase winding 41b are connected by a jumper wire 41g. The V+phase winding 41c and the V−phase winding 41d are connected by a jumper wire 41h. The W+phase winding 41e and the W−phase winding 41f are connected by a jumper wire 41j. The X+phase winding 51a and the X−phase winding 51b are connected by a jumper wire 51g. The Y+phase winding 51c and the Y−phase winding 51d are connected by a jumper wire 51h. The Z+phase winding 51e and the Z−phase winding 51f are connected by a jumper wire 51j. The jumper wires 41g, 41h, 41j, 51g, 51h, 51j are provided on the other end side in the axial direction of the stator core 31 and on the side not facing the hydro unit 11 (lower side in FIG. 1). As shown schematically in FIG. 2, those jumper wires are provided by being guided by a guide portion 32a (see FIG. 4) to be described later connecting the insulators 32. The jumper wire 41j connecting the W+phase winding 41e and the W−phase winding 41f and the jumper wire 51j connecting the Z+phase winding 51e and the Z−phase winding 51f are routed outward in the radial direction with respect to the other jumper wires 41g, 41h, 51g, 51h, and thus are longer than the other jumper wires 41g, 41h, 51g, 51h.

The first three-phase winding 40 of the present embodiment is connected to the first inverter circuit 12a by a delta connection. The second three-phase winding 50 is connected to the second inverter circuit 12b by a delta connection.

More specifically, a terminal line 33a of the U+phase winding 41a is connected to an U terminal of the first inverter circuit 12a together with a terminal line 33a of the W−phase winding 41f. A terminal line 33a of the U−phase winding 41b is connected to a V terminal of the first inverter circuit 12a together with a terminal line 33a of the V+phase winding 41c. A terminal line 33a of the W+phase winding 41e is connected to a W terminal of the first inverter circuit 12a together with a terminal line 33a of the V−phase winding 41d.

A terminal line 33a of the X+phase winding 51a is connected to a X terminal of the second inverter circuit 12b together with a terminal line 33a of the Z−phase winding 51f. A terminal line 33a of the X−phase winding 51b is connected to a Y terminal of the second inverter circuit 12b together with a terminal line 33a of the Y+phase winding 51c. A terminal line 33a of the Z+phase winding 51e is connected to a Z terminal of the second inverter circuit 12b together with a terminal line 33a of the Y−phase winding 51d. In addition, the jumper wires 41g, 41h, 41j, 51g, 51h, 51j connect the ends of the coil 33 on the opposite side to the above terminal line 33a for each phase.

As shown in FIG. 1, in the stator 30, a guide member 60 is provided on the side of the hydro unit 11, which is one side in the axial direction of the stator core 31.

The guide member 60 guides the terminal lines 33a of the coils 33 which is drawn from the coil 33 to one side in the axial direction, and further guides them to the EDU 12. The guide member 60 includes a guide body 61 and a pullout guide 62 for pulling out.

As shown in FIG. 3, the guide body 61 is formed in a substantially disk shape having a plurality of steps in the axial direction, and includes a plurality of notches 63 extending from the radially outer side to the radially inner side and penetrating in the axial direction. The terminal line 33a of the coil 33 passes through the notch 63 in the axial direction, is led out to one side in the axial direction of the guide body 61, is bent in the circumferential direction, and extends along the step of the guide body 61. The terminal line 33a is guided in the circumferential direction up to a part of the guide body 61 in the circumferential direction.

A pullout guide 62 is configured to have a long column shape in the axial direction, and is fixed to a part in the circumferential direction of the guide body 61. Then, the terminal lines 33a guided to a part in the circumferential direction of the guide body 61 passes through an inside of the pullout guide 62 and is led out to one side in the axial direction. As described above, the terminal lines 33a are connected to the first and second inverter circuits 12a, 12b.

Here, the stator core 31 of the present embodiment has a configuration in which the annular portion 31a is divided for each tooth 31b. The core constituent member 31d includes a tooth 31b extending radially inward and a pair of core outer extension portions 31c extending circumferentially from radially outer ends on both sides of the tooth 31b. A plurality of the core constituent members 31d are arranged side by side in the circumferential direction. Specifically, in the present embodiment, the core outer extension portions 31c of the twelve core constituent members 31d are arranged in the circumferential direction so as to form an annular shape, and the core outer extension portions 31c adjacent to each other in the circumferential direction are welded to form the stator core 31.

Figure 5:
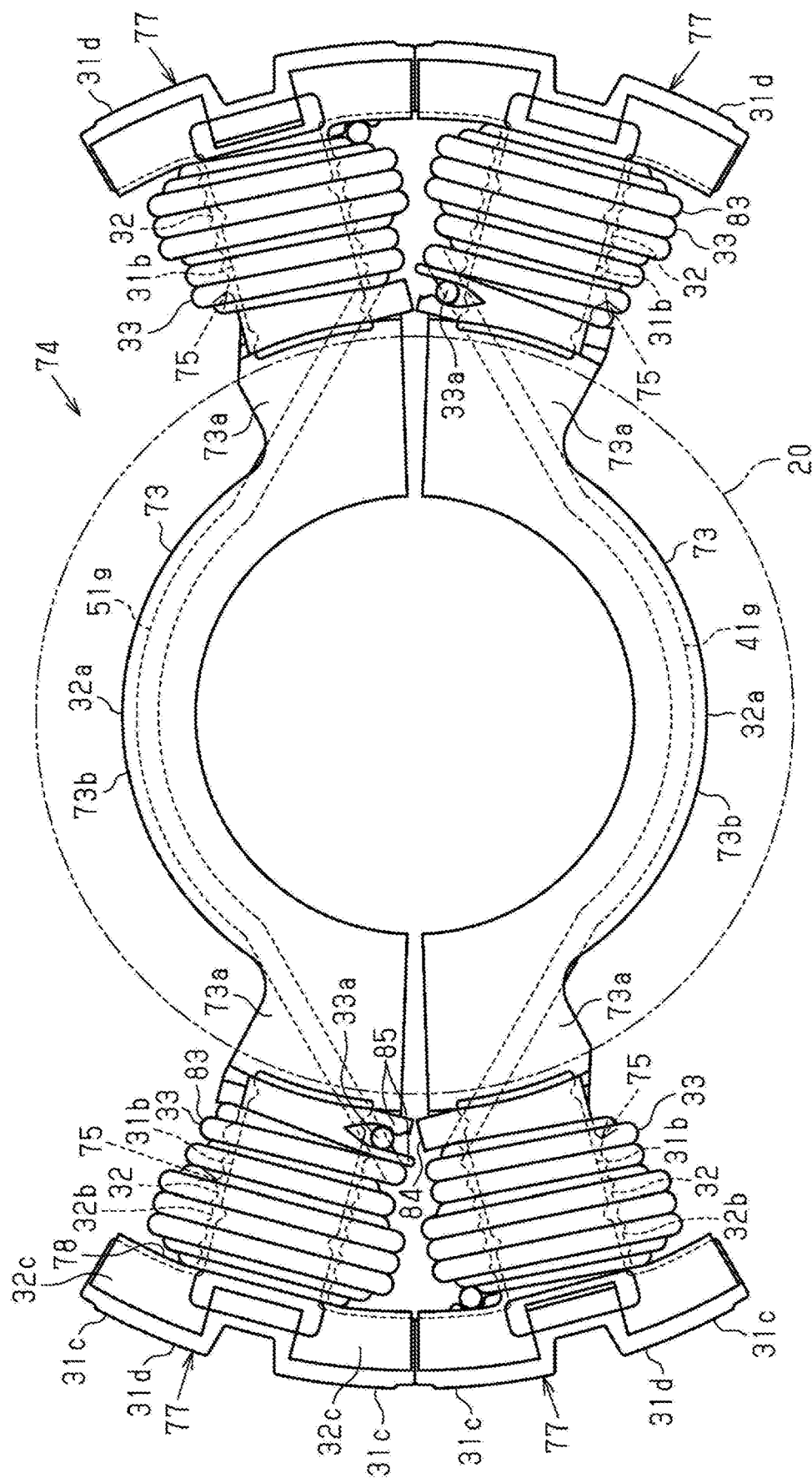
FIG. 5 is a plan view of the core unit of the stator in the same embodiment.
Figure 6:
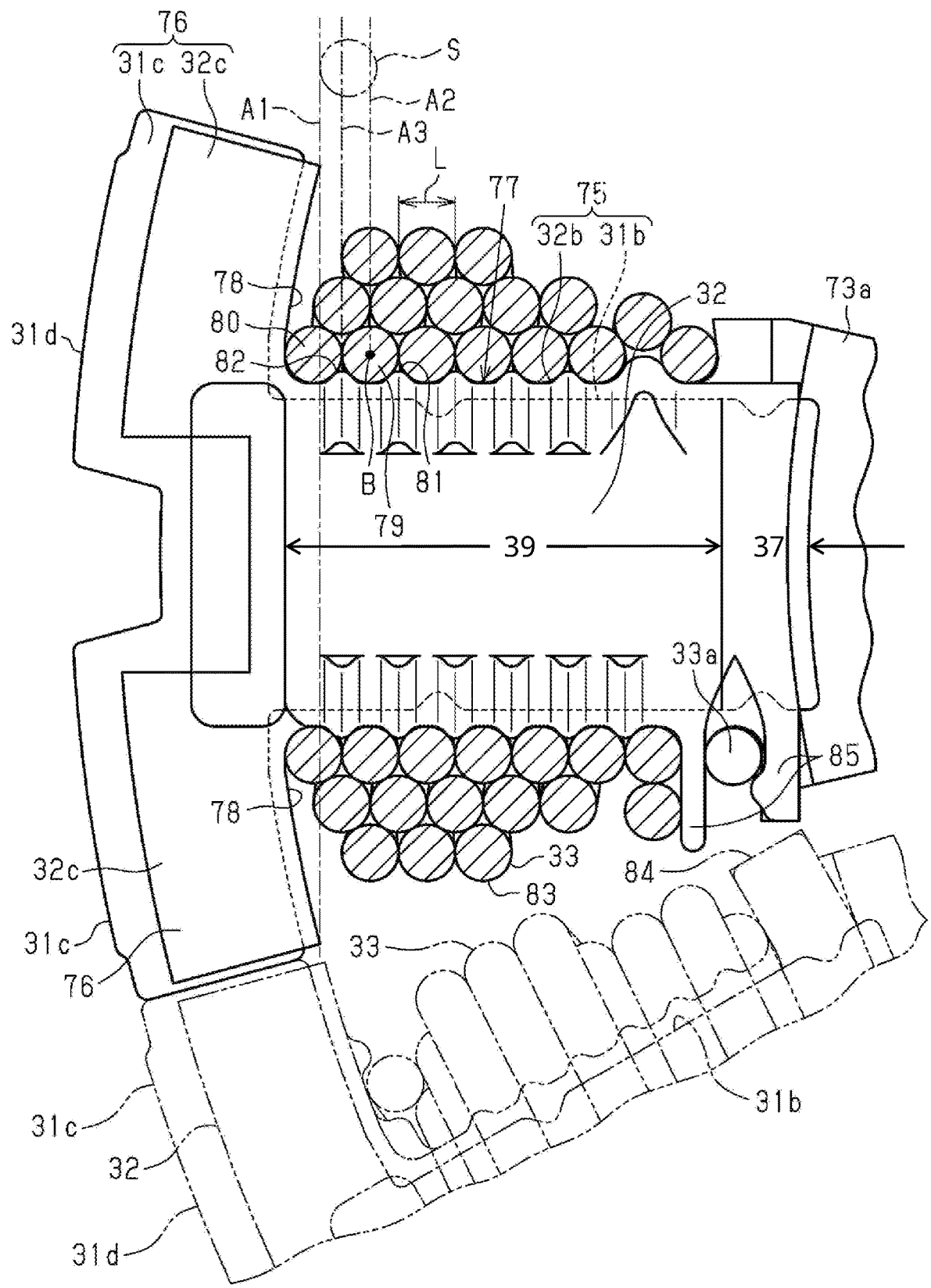
FIG. 6 is a partial plan view of the core unit of the stator in the same embodiment.

Further, as shown in FIGS. 5 and 6, in the teeth 31b of the present embodiment, a width of a tip portion 37 around which the coil 33 is not wound and a width of an intermediate portion 39 around which the coil 33 is wound, as viewed from the axial direction, are the same. The width of the tip portion 37 is set so as not to be larger than the width of the intermediate portion 39. Further, the core outer extension portion 31c is formed in an arc shape on both the radially outer surface and the radially inner surface when viewed from the axial direction. The coils 33 are wound around the teeth 31b via the insulator 32 in a state before the core constituent members 31d are arranged side by side in the circumferential direction.

Figure 4:
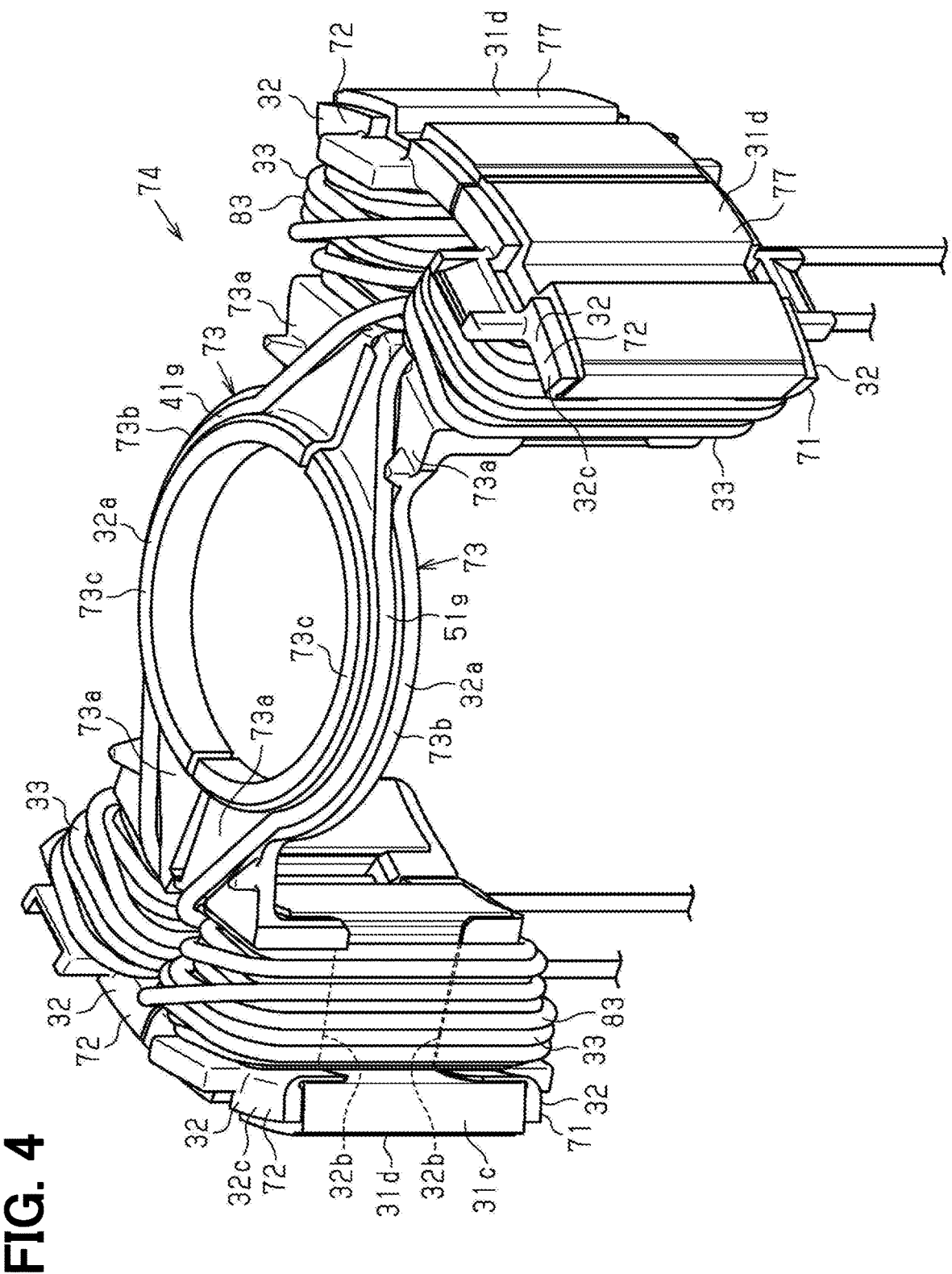
FIG. 4 is a perspective view of a core unit of the stator in the same embodiment.

As shown in FIG. 4, the insulator 32 of the present embodiment includes a first insulator 71 which is assembled from one axial side of the core constituent member 31d (the lower side in FIG. 4), and a second insulator 72 which is assembled from the other axial side of the core constituent member 31d (the upper side in FIG. 4). A pair of second insulators 72 are connected to each other by the guide portion 32a, the second insulators 72 constitute a connecting insulator member 73. The guide portion 32a connects the second insulators 72 separated by 150 degrees in the circumferential direction. The guide portion 32a includes inner extension parts 73a extending from a radially inner side of the second insulator 72 to an inner side in the radial direction, and an arc connection part 73b connecting the inner extension parts 73a. The arc connection part 73b is formed in an arc shape when viewed from the axial direction. An arc wall part 73c protruding in the axial direction is formed on the radially inner side of the arc connection part 73b, and the jumper wires 41g, 41h, 41j, 51g, 51h, 51j are guided along an outer surface in the radial direction of the arc wall part 73c. As shown in FIGS. 4 and 5, one core unit 74 having two sets of core constituent members 31d separated by 150 degrees. The stator 30 of the present embodiment has three core units 74, and the positions of the guide portions 32a of the respective core units are slightly shifted in the axial direction and in the radial direction so that the guide portions 32a do not collide with each other when the core units 74 are assembled (not shown).

The insulator 32 that corresponds to the first insulator 71 and the second insulator 72 has a tooth covering portion 32b. The tooth covering portion 32b covers an axial end surface of the tooth 31b and a part of a circumferential end surface that is bent from the axial end surface. The insulator 32 has an outer covering portion 32c that extends from the radially outer side of the tooth covering portion 32b so as to cover a radially inner side surface and a part of an axial end surface of the core outer extension portion 31c.

In the present embodiment, the tooth 31b and the tooth covering portion 32b extending in the radial direction constitute a wound portion 75 around which the coil 33 is wound. The core outer extension portion 31c and the outer covering portion 32c constitute a pair of outer extension portions 76 which extends from the radially outer end of the wound portion 75 in both the circumferential directions. The wound portion 75 and the outer extension portion 76 constitute a wound member 77.

As shown in FIG. 6, a winding outermost diameter position A1 is a virtual straight line that contacts the radially inner ends at circumferential tip ends of the pair of outer extension portions 76 when viewed from the axial direction. On an inner side in the radial direction of a base portion of the outer extension portions 76, a concave portion 78 is recessed radially outward from the winding outermost diameter position A1. In the present embodiment, the coil 33 is wound so as to turn around the wound portion 75 by using a flyer device (not shown) that moves circularly. Therefore, a position where the wire S can be guided by using the flyer device is radially inward from the winding outermost diameter position A1, which is a position where the wire S does not collide with the outer extension portion 76. The core outer extension portion 31c of the present embodiment has a radially inner surface formed in an arc shape when viewed from the axial direction, and the outer covering portion 32c has covered the radially inner surface with uniform thickness. Therefore, a concave portion 78 is provided on the radially inner side at the base portion of the outer extension portion 76 so as to be recessed radially outward from the winding outermost diameter position A1.

A first layer of the coil 33 wound so as to be in direct contact with the wound portion 75 includes a first coil 79. A center B of the first coil 79 is positioned radially inward from the winding outermost diameter position A1 and in a range between 0.5 times a coil wire diameter L and 1.5 times the coil wire diameter L with respect to the winding outermost diameter position A1. In other words, the first coil 79 has a radially outer position that is radially inner than the winding outermost diameter position A1 and the first coil 79 is disposed radially outward from a position separated from the winding outermost diameter position A1 by the coil wire diameter L. That is, a radial position A2 of the center B of the first coil 79 is set so that a distance from the winding outermost diameter position A1 to the radial position A2 is larger than 0.5 times the coil wire diameter L and smaller than 1.5 times the coil wire diameter L. Specifically, the center B of the first coil 79 of the present embodiment is disposed radially inward from the winding outermost diameter position A1 by about 0.8 times the coil wire diameter L. The first layer of the coil 33 has a second coil 80 partially disposed in the concave portion 78 on the radially outer side of the first coil 79.

The insulator 32 includes a first convex portion 81 that restricts the movement of the first coil 79 inward in the radial direction. The first convex portion 81 is formed such that a radial width gradually decreases toward a top, and the top is curved. The protruding amount of the first convex portion 81 is set to about ⅕ of the coil wire diameter L. The insulator 32 includes a second convex portion 82 that restricts the movement of the first coil 79 outward in the radial direction. The second convex portion 82 is formed such that a radial width gradually decreases toward a top, and the top is curved. The protruding amount of the first convex portion 81 is set to about ⅕ of the coil wire diameter L. Further, a position of the top of the second convex portion 82 is arranged radially inside the winding outermost diameter position A1 and within 0.5 times the coil wire diameter L. That is, a radial position A3 of the top of the second convex portion 82 is set so that a distance from the winding outermost diameter position A1 to the radial portion A3 is smaller than 0.5 times the coil wire diameter L.

Thereby, the coil 33 is wound from the radial inside of the wound portion 75 by using the flyer device. When the first coil 79 is wound, if the coil 33 is wound substantially along the winding outermost diameter position A1, the coil 33 is guided to the top of the second convex portion 82. Therefore, since the center B of the first coil 79 is larger than 0.5 times the coil wire diameter L, the first coil 79 is disposed radially inward from the winding outermost diameter position A1. Further, after the first coil 79 is wound, the second coil 80 is wound along the winding outermost diameter position A1. The second coil 80 is guided to the outer peripheral surface of the first coil 79, and the second coil 80 is disposed outside the first coil 79 in the radial direction and in the concave portion 78. In FIG. 6, when the coil 33 is wound along the winding outermost diameter position A1, the position of the wire S of the coil 33 is indicated by a two-dot chain line.

Further, as shown in FIG. 5, the coil 33 of the present embodiment is continuously wound around a pair of wound portions 75 connected by the guide portion 32a of the connecting insulator member 73. A winding start of the coil 33 is set on the radially inner side of the wound portion 75, and the winding start constitutes the terminal line 33a drawn from the radially inner side of the coil 33 to one side in the axial direction. As described above, the coil 33 includes a terminal inner coil 83 in which the terminal line 33a is drawn from the radially inner side to one side in the axial direction.

The insulator 32 covers the teeth 31b that are circumferentially adjacent to the teeth 31b around which the terminal inner coil 83 is wound, and the insulator 32 has a restriction portion 84 that restricts the movement of the terminal line 33a of the terminal inner coil 83.

Specifically, as shown in FIG. 6, first, the insulator 32 that covers the tooth 31b around which the terminal inner coil 83 is wound has a radial direction restriction portion 85 that restricts the radial movement of the terminal line 33a of the terminal inner coil 83. A pair of the radial direction restriction portions 85 are provided in the radial direction, and are formed so as to protrude in the direction orthogonal to the radial direction and open in the same direction when viewed from the axial direction. In the radial direction restriction portion 85, the wire S of the coil 33 can be inserted into the inside of the radial direction restriction portion 85 from the direction orthogonal to the radial direction, and the wire S is disposed inside by the flyer device. In addition, an opening part of the radial direction restriction portion 85 of the present embodiment is formed so that a width of the opening part is slightly smaller than the coil wire diameter L, and the wire S becomes difficult to come off, when the wire S is inserted in the inside. The restriction portion 84 is formed to protrude from the insulator 32 in a direction orthogonal to the radial direction so as to substantially cover the opening part of the radial direction restriction portion 85. Therefore, the restriction portion 84 restricts the movement of the terminal line 33a of the terminal inner coil 83 in the circumferential direction. The insulator 32 covers the tooth 31b and the tooth 31b adjacent to the tooth 31b in the circumferential direction, around which the terminal inner coil 83 is wound. The restriction portion 84 is set so that the distance from the tip of the radial direction restriction portion 85 is smaller than the coil wire diameter L, and the coil 33 disposed inside the radial direction restriction portion 85 is set so as not to jump out from the radial direction restriction portion 85.

The core outer extension portion 31c is formed such that its radially inner surface is formed in an arc shape when viewed from the axial direction. However, the radially inner surface may have a concave shape other than the arc shape. The gap between the concave shape and the first coil 79 is set larger than the coil wire diameter L.

Next, a method for manufacturing the stator 30 configured as mentioned above and its function will be described.

First, as shown in FIG. 6, the insulator 32 is assembled to the core constituent member 31d to manufacture the wound member 77, and the coil 33, that is specifically the terminal inner coil 83, is wound the on the wound portion 75 including the tooth 31b and the tooth covering portion 32b by using the flyer device.

At this time, the winding start of the coil 33 is first inserted into the radial direction restriction portion 85, and the coil 33 of the first layer is sequentially wound from the radially inner side toward the radially outer side. At this time, the first coil 79 and the second coil 80 are sequentially wound on the outer side in the radial direction on the wound portion 75, and the second coil 80 is guided to the outer peripheral surface of the first coil 79 so as to be disposed on the outer side in the radial direction of the first coil 79 and in the concave portion 78.

Thereafter, the coils that become the second layer and later layers are sequentially wound toward the inner side in the radial direction or the outer side in the radial direction, and the jumper wires 41g, 41h, 41j, 51g, 51h, 51j are formed along the guide portion 32a. Thereafter, the coil 33 separated by 150 degrees is wound around the wound portion 75 connected by the guide portion 32a.

Then, as shown in FIGS. 4 and 5, a core unit 74 is manufactured by arranging two sets of subassemblies that include coils 33 wound in the same manner side by side in the circumferential direction. At this time, the restriction portion 84 is disposed so as to substantially cover the opening part of the radial direction restriction portion 85, so that the coil 33 disposed inside the radial direction restriction portion 85 is prevented from jumping out to the outside. Therefore, the movement of the terminal line 33a is prevented.

Three core units 74 having substantially the same configuration are assembled in the circumferential direction, and then the core outer extension portions 31c adjacent in the circumferential direction are welded together so as to manufacture the stator core 31.

Then, as shown in FIG. 3, the guide body 61 of the guide member 60 is assembled to one side of the stator core 31 in the axial direction. The terminal line 33a of the coil 33 is led out from the notch 63 to one side in the axial direction. Further, the terminal line 33a is bent in the circumferential direction and led out from one part in the circumferential direction to one side in the axial direction of the pullout guide 62 through the pullout guide 62. Then, the manufacture of the stator 30 is completed.

Next, the effects of the present embodiment are described be low.

(1) The insulator 32 covers the teeth 31b that are circumferentially adjacent to the teeth 31b around which the terminal inner coil 83 is wound, and the insulator 32 has the restriction portion 84. Therefore, the movement of the terminal line 33a of the terminal inner coil 83 can be restricted. Therefore, for example, the terminal line 33a of the terminal inner coil 83 is prevented from coming into contact with another coil 33 or the rotor 20 provided inside the stator 30 in the radial direction. In addition, since the terminal inner coil 83 is wound around the tooth 31b before the core constituent member 31d are arranged side by side in the circumferential direction, the restriction portion 84 does not become an obstacle. Therefore, the winding operation can be easily performed.

(2) The insulator 32 that covers the tooth 31b around which the terminal inner coil 83 is wound has a radial direction restriction portion 85 that restricts the radial movement of the terminal line 33a of the terminal inner coil 83. Thus, for example, when winding the terminal inner coil 83 before the core constituent members 31d are arranged side by side in the circumferential direction, the radial movement of the terminal line 33a of the terminal inner coil 83 can be restricted. The restriction portion 84 restricts the movement of the terminal line 33a of the terminal inner coil 83 in the circumferential direction. Therefore, in a state where the core constituent members 31d are arranged side by side in the circumferential direction, the movement of the terminal line 33a of the terminal inner coil 83 in each direction can be restricted.

(3) The width of the tip end of the tooth 31b where the coil 33 is not wound is set to be the same as the width of the intermediate portion 39 where the coil 33 is wound when viewed from the axial direction. Therefore, the terminal line 33a is configured to be more likely to protrude radially inward than the tooth 31b, as compared with the case where the width of the distal end portion of the tooth 31b is increased, for example. In such a configuration, since the movement of the terminal line 33a of the terminal inner coil 83 is restricted, the effect on the restriction is great.

(4) Since the terminal line 33a of the terminal inner coil 83 is bent at one axial side of the terminal inner coil 83, it is easy to move when the terminal line 33a is bent. In such a configuration, since the movement of the terminal line 33a of the terminal inner coil 83 is restricted, the effect on the restriction is great.

(5) The terminal inner coil 83 and the coil 33 adjacent in the circumferential direction are different phases (see FIG. 2). For example, if the terminal line 33a of the terminal inner coil 83 contacts and is electrically connected to another coil 33, the normal performance of the motor 10 is greatly impaired. In such a configuration, since the movement of the terminal line 33a of the terminal inner coil 83 is restricted, and the contact of the terminal line 33a to another coil 33 is prevented, the effect on the restriction is great.

The above described embodiments may be modified as follows. The above described embodiments and the following modifications can be implemented in combination with one another as long as there is no technical contradiction.

In the above-described embodiment, the insulator 32 that covers the teeth 31b around which the terminal inner coil 83 is wound is provided with the radial direction restriction portion 85 that restricts the radial movement of the terminal line 33a of the terminal inner coil 83. However, the present disclosure is not limited to this. For example, the restriction portion 84 may be provided with a shape that regulates the movement of the terminal line 33a in the radial direction.

The width of the tip portion 37 at the tip end of the tooth 31b where the coil 33 is not wound is set to be the same as the width of the intermediate portion 39 where the coil 33 is wound when viewed from the axial direction. However, for example, the width of the tip of the tooth 31b may be larger than the width of the intermediate portion 39.

In the above embodiment, the terminal line 33a of the terminal inner coil 83 is bent at one axial side of the terminal inner coil 83. However, for example, the terminal line 33a may be connected to a bus bar or the like without being bent.

In the above embodiment, the terminal inner coil 83 and the coil 33 adjacent in the circumferential direction are the different phases (see FIG. 2). However, for example, a stator may have only coils connected to circuits constituting one system, and the terminal inner coil and the coil adjacent in the circumferential direction may be the same phase.

In above embodiment, although the stator 30 which has twelve teeth 31b is disclosed, the stators having other than the number of the teeth 31b may be employed.

Conventionally, in an assumable stator, a core constituent member includes a tooth extending inward in a radial direction and a pair of core outer extension portions extending in a circumferential direction from an outer end in the radial direction of the teeth. A plurality of core constituent members are arranged side by side in a circumferential direction. Coils are wound around the tooth via an insulator (see, for example, Patent Document 1). In such a stator, a flyer device moves in a circular motion to swivel around the tooth so as to wind the coils in a state before the core constituent members are arranged side by side in the circumferential direction. By using the flyer device, when winding the coils, the teeth of the core constituent members that are adjacent in the circumferential direction do not become an obstacle, and the coils can be easily wound.

By the way, in the above stator coil, there is a case where a winding start needs to be positioned radially inward. In that case, a terminal line is drawn out from a radial inside of the coil to one side in an axial direction. Then, there is a possibility that a position of the above terminal line may be shifted by bending at one side in the axial direction of the coil or by vibration of the coil or the like. Therefore, there is a possibility that the terminal line may come into contact with another coil or a rotor provided inside the stator in a radial direction so that a normal performance of the motor may be impaired.

The present disclosure is made to solve the above-described problems, and an object of the present disclosure is to provide a stator which can easily perform a winding operation and can restrict movement of the terminal line.

A stator includes a plurality of core constituent members (31d) arranged side by side in a circumferential direction, each of which has a tooth (31b) extending in a radial direction and a pair of core outer extension portion (31c) extending in the both circumferential directions from a radial outer end portion of the tooth, and an insulator (32) covering at least a part of the tooth, and a coil (33) wound around the tooth via the insulator. The coil includes a terminal inner coil (83) having a terminal line (33a) which is drawn from a radially inner side to one side in an axial direction. The insulator covers the tooth circumferentially adjacent to the tooth around which the terminal inner coil is wound. The insulator has a restriction portion (84) that restricts movement of the terminal line of the terminal inner coil.

According to this configuration, the insulator has the restriction portion that restricts the movement of the terminal line of the terminal inner coil. Therefore, movement of the terminal line of the terminal inner coil is restricted. Therefore, for example, the terminal line of the terminal inner coil is prevented from coming into contact with another coil or the rotor provided inside the stator in the radial direction. In addition, since the terminal inner coil is wound around the tooth before the core constituent member are arranged side by side in the circumferential direction, the restriction portion does not become an obstacle. Therefore, the winding operation can be easily performed.

The invention claimed is:

1. A stator comprising:
a plurality of core constituent members arranged side by side in a circumferential direction, each of which has a tooth extending in a radial direction and a pair of core outer extension portions extending in both circumferential directions from a radial outer end portion of the tooth;
an insulator that covers at least a part of the tooth; and
a coil wound around the tooth via the insulator, wherein
the coil includes a terminal inner coil having a terminal line which is drawn from a radially inner side to one side in an axial direction,
the insulator covers the tooth circumferentially adjacent to the tooth around which the terminal inner coil is wound, and the insulator has a restriction portion that restricts movement of the terminal line of the terminal inner coil, and
a width of a tip portion of the tooth is set to be the same as a width of an intermediate portion when viewed from the axial direction,
the tip portion comprising a first region of the tooth within which the coil is not wound around the tooth, the tip portion positioned radially inward of the intermediate portion and extending radially inward from the intermediate portion to a tip end of the tooth, and the intermediate portion comprising a second region of the tooth within which the coil is wound around the tooth, the intermediate portion being positioned radially outward of the tip portion.

2. The stator according to claim 1, wherein the insulator that covers the tooth around which the terminal inner coil is wound has a radial direction restriction portion that restricts a radial movement of the terminal line of the terminal inner coil, and the radial direction restriction portion restricts movement of the terminal inner coil in the circumferential direction of the terminal line.

3. A method for manufacturing the stator according to claim 2, comprising the steps of:

(1) inserting a winding start of the coil into the radial direction restriction portion, and (2) winding the coil of a first layer sequentially from a radially inner side toward a radially outer side.

4. The stator according to claim 1, wherein a width of a tip end of the tooth where the coil is not wound is set to be the same as a width of an intermediate portion where the coil is wound when viewed from the axial direction.

5. The stator according to claim 1, wherein the terminal line of the terminal inner coil is bent at one axial side of the terminal inner coil.

6. The stator according to claim 1, wherein the terminal inner coil and another coil adjacent in the circumferential direction are different phases.

* * * * *